United States Patent
Nishizawa et al.

(10) Patent No.: US 9,381,690 B2
(45) Date of Patent: Jul. 5, 2016

(54) MOVABLE PLATEN SUPPORT STRUCTURE FOR AN INJECTION MOLDING APPARATUS

(71) Applicant: NISSEI PLASTIC INDUSTRIAL CO., LTD., Hanishina-gun, Nagano (JP)

(72) Inventors: Tatsuhiko Nishizawa, Nagano (JP); Atsushi Murata, Nagano (JP); Isamu Yamaguchi, Nagano (JP); Kimiaki Shioiri, Nagano (JP)

(73) Assignee: NISSEI PLASTIC INDUSTRIAL CO., LTD. (JP)

( * ) Notice: Subject to any disclaimer, the term of this patent is extended or adjusted under 35 U.S.C. 154(b) by 0 days.

(21) Appl. No.: 14/753,360

(22) Filed: Jun. 29, 2015

(65) Prior Publication Data

US 2016/0023391 A1 Jan. 28, 2016

(30) Foreign Application Priority Data

Jul. 28, 2014 (JP) ................................. 2014-153109

(51) Int. Cl.
*B29C 45/64* (2006.01)
*B29C 45/17* (2006.01)
*B29C 45/66* (2006.01)
*B30B 15/00* (2006.01)

(52) U.S. Cl.
CPC ......... *B29C 45/1744* (2013.01); *B29C 45/1761* (2013.01); *B29C 45/661* (2013.01); *B30B 15/007* (2013.01)

(58) Field of Classification Search
CPC .. B29C 45/1761; B29C 45/661; B30B 15/007
USPC ................... 425/589, 593; 100/258 A, 258 R
See application file for complete search history.

(56) References Cited

U.S. PATENT DOCUMENTS

| | | | | | |
|---|---|---|---|---|---|
| 5,249,951 | A | * | 10/1993 | Leonhartsberger | B29C 45/1761 100/258 A |
| 5,547,367 | A | * | 8/1996 | Stein | B29C 45/1761 100/258 A |
| RE35,783 | E | * | 5/1998 | Leonhartsberger | B29C 45/1761 100/258 A |
| 7,455,511 | B2 | * | 11/2008 | Nishimura | B29C 45/1744 100/258 A |

FOREIGN PATENT DOCUMENTS

JP 4676548 2/2011

* cited by examiner

*Primary Examiner* — Tim Heitbrink
(74) *Attorney, Agent, or Firm* — Adams & Wilks

(57) ABSTRACT

A movable platen support structure includes: a linear guide mechanism via which a movable platen is provided for horizontal movement; a plurality of movable-platen height adjustment mechanisms provided in corresponding relation to leg sections of the platen, each of the height adjustment mechanisms including a flat plate placed on a corresponding slider of the guide mechanism, and an adjusting bolt screwed into the corresponding leg section of the slider and abutting at its distal end against the flat plate; and a plurality of fastening mechanisms provided in corresponding relation to the leg sections, each of the fastening mechanisms including a fastening bolt for, following the height adjustment by the adjusting bolts, fastening the corresponding leg section to the corresponding slider by being passed through the leg section and the flat plate so as to be screwed into the slider.

2 Claims, 6 Drawing Sheets

100

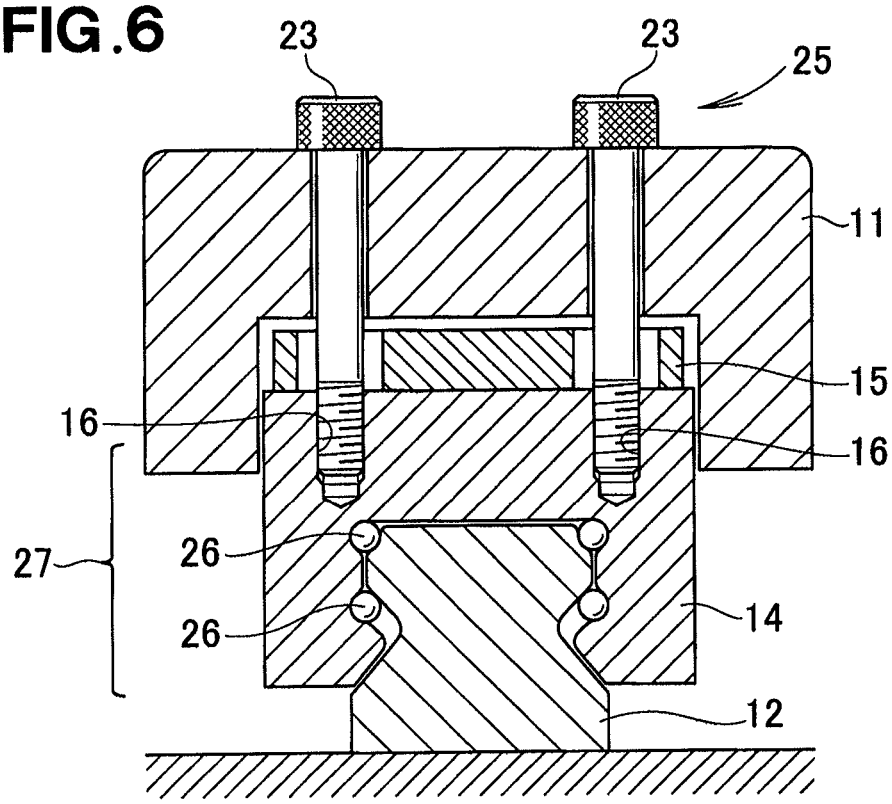

MOVABLE PLATEN SUPPORT STRUCTURE FOR AN INJECTION MOLDING APPARATUS

FIELD OF THE INVENTION

The present invention relates generally to an injection molding apparatus and more particularly a support structure provided in the injection molding apparatus to support a movable platen mounted on a bed for horizontal movement via a linear guide mechanism.

BACKGROUND OF THE INVENTION

In the conventionally-known injection molding apparatus, a mold is clamped by a fixed or stationary platen and a movable platen of a mold clamping mechanism, and a resin material is injected into the clamped mold by means of an injection machine. After the resin material hardens, the movable platen is moved away from the stationary platen to open the mold, so that a molded resin product is removed from the mold. The movable platen is reciprocally moved along a rail on the bed. In recent years, it has been getting increasingly popular to employ a linear guide mechanism called a linear guide with a view to allowing for smoother movement of the movable platen, as disclosed for example in Japanese Patent No. 4676548 (hereinafter referred to as "Patent Literature 1").

In a movable platen support mechanism disclosed in Patent Literature 1, a linear guide block is placed on a linear guide rail for linear horizontal movement along the linear guide rail. A guide block is placed on the linear guide block, and the movable platen is placed on the guide block. Because frictional resistance produced the linear guide rail and the linear guide block is small, the movable platen placed on the linear guide block can be moved horizontally with an extreme smoothness.

In recent years, precision of the molds has been improving, and precision of the mold clamping mechanisms required for injection molding work, which frequently repeats mold clamping and mold opening, has also being improving. As known, it is important to move the movable platen while maintaining the movable platen in a horizontal posture. Because, if the movable platen is not maintained in a horizontal posture, the accuracy of the mold is adversely influenced, and even breakage of the mold might result at the worst. However, the construction disclosed in Patent Literature 1 cannot adjust the levelness of the movable platen. Various mechanisms capable of adjusting the levelness of the movable platen have been proposed to date, one example of which is disclosed in Japanese Patent No. 4550649 (hereinafter referred to as "Patent Literature 2").

In a movable die (corresponding to the movable platen) support apparatus disclosed in Patent Literature 2, a mounting base is placed on a linear guide, a movable die support member is placed on the mounting base, and a movable die (movable platen) is placed on the movable die support member. Further, first and second wedges are inserted between the mounting base and the movable die support member. Thus, an inclination of the movable die support member relative to the mounting base can be adjusted by the first and second wedges being removed and inserted again. However, the first and second wedges project outwardly of the movable die support apparatus by a considerable amount and thus tend to be large in size as a movable die (movable platen) height adjustment mechanism. Size reduction of the height adjustment mechanism is highly required amid the current growing demand for downsizing of the injection molding apparatus.

SUMMARY OF THE INVENTION

In view of the foregoing prior art problems, it is an object of the present invention to provide an improved movable platen support structure for an injection molding apparatus which includes a compact movable-platen height adjustment mechanism.

In order to accomplish the above-mentioned object, the present invention a movable platen support structure for an injection molding apparatus, which comprises: a linear guide mechanism via which a movable platen of the injection molding apparatus is mounted on a bed for horizontal movement, the linear guide mechanism including a plurality of rails provided in parallel spaced apart relation to each other in a width direction of the bed, and a plurality of sliders mounted on the rail via a bearing in spaced apart relation to each other in a longitudinal direction of the rail, the movable platen having a plurality of leg sections placed on corresponding ones of the sliders; a plurality of movable-platen height adjustment mechanisms provided in corresponding relation to the leg sections, each of the movable-platen height adjustment mechanisms comprising a flat plate placed on a corresponding one of the sliders, and an adjusting bolt screwed into a corresponding one of the leg sections and abutting at the distal end thereof against the flat plate; and a plurality of fastening mechanisms provided in corresponding relation to the leg sections and the movable-platen height adjustment mechanisms, each of the fastening mechanisms comprising a fastening bolt for, following movable platen height adjustment by the adjusting bolts, fastening a corresponding one of the leg sections to a corresponding one of the sliders by being passed through the corresponding leg section and a corresponding one of the flat plates so as to be screwed into the corresponding slider.

According to the present invention, the movable platen has the plurality of leg sections placed on and connected to the corresponding sliders by means of the fastening bolts of the fastening mechanisms. The movable-platen height adjustment mechanisms, provided in corresponding relation to the leg sections, each include the flat plate placed on the corresponding slider, and the adjusting bolt screwed into the corresponding leg section and abutting at the distal end thereof against the flat plate. The adjusting bolt is oriented vertically and screwed into the leg section from above. Namely, the adjusting bolt is accommodated within the width of the leg section with no portion of the adjusting bolt projecting laterally outward from the leg section. Thus, the movable platen height adjustment mechanism can be constructed compact. In addition, the movable platen height adjustment mechanism, comprising only the flat plate and the adjusting bolt, can be very simple in construction and thus can be reduced in cost. As a result, the movable platen support structure of the present invention can be constructed simple and compact at low cost.

In a preferred embodiment of the invention, the flat plate is formed of a material having a lower heat conductivity than the leg section and the slider. The movable platen rises in temperature by being exposed to heat of a resin material in a mold. The leg sections of the movable platen too rise in temperature. However, if the temperature rises to a considerable degree, the linear guide mechanism, which is a high-precision mechanism containing the bearings, cannot perform its primary function due to thermal expansion. The flat plate of a low heat conductivity can shut off or reduce flows of heat from the leg section toward the slider. As a consequence, variation in temperature of the linear guide mechanism can be suppressed effectively, so that the linear guide mechanism can fulfill its primary function as a high-precision mechanism.

The following will describe embodiments of the present invention, but it should be appreciated that the present invention is not limited to the described embodiments and various modifications of the invention are possible without departing from the basic principles. The scope of the present invention is therefore to be determined solely by the appended claims.

BRIEF DESCRIPTION OF THE DRAWINGS

Certain preferred embodiments of the present invention will hereinafter be described in detail, by way of example only, with reference to the accompanying drawings, in which:

FIG. 6 is a sectional view taken along line 6-6 of FIG. 2.

DETAILED DESCRIPTION OF THE INVENTION

Figure 1:
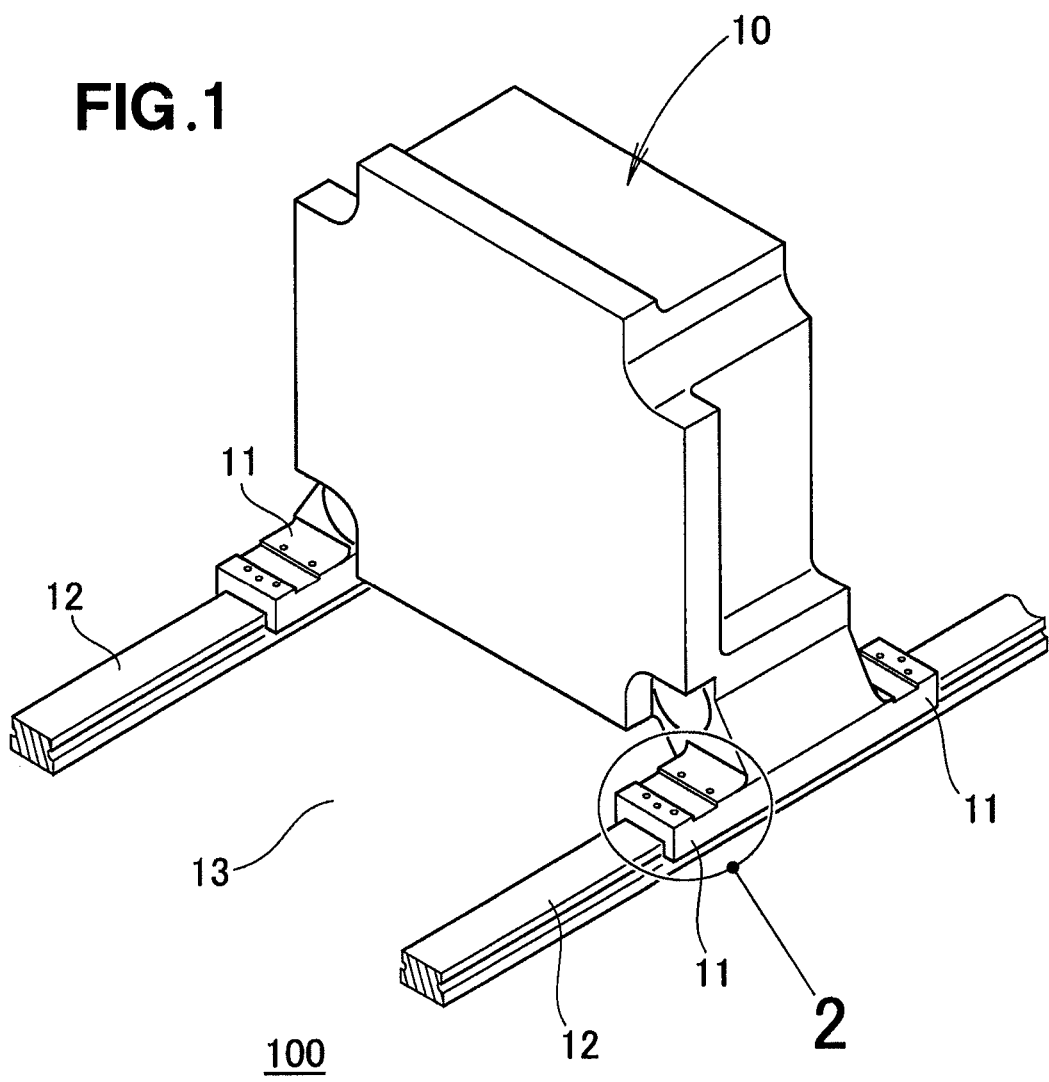
FIG. 1 is a perspective view of an embodiment of a movable platen support structure of the present invention.

FIG. 1 is a perspective showing an embodiment of a movable platen support structure 100 of the present invention, which is provided in an injection molding apparatus for supporting a movable platen 10 of the injection molding apparatus. The movable platen 10 has a total of four leg sections 11 provided on a lower end section thereof and spaced apart from one another both in a width direction of the platen 10 and in a moving direction of the platen 10. Each of the leg sections 11 has a generally rectangular shape as viewed in top plan. Two of the leg sections 11 are placed on a left rail 12, while the other two leg sections 11 are placed on a right rail 12. The left and right rails 12 are placed on a bed 13 in parallel spaced apart relation to each other in a width direction of the bed 13.

Figure 2:
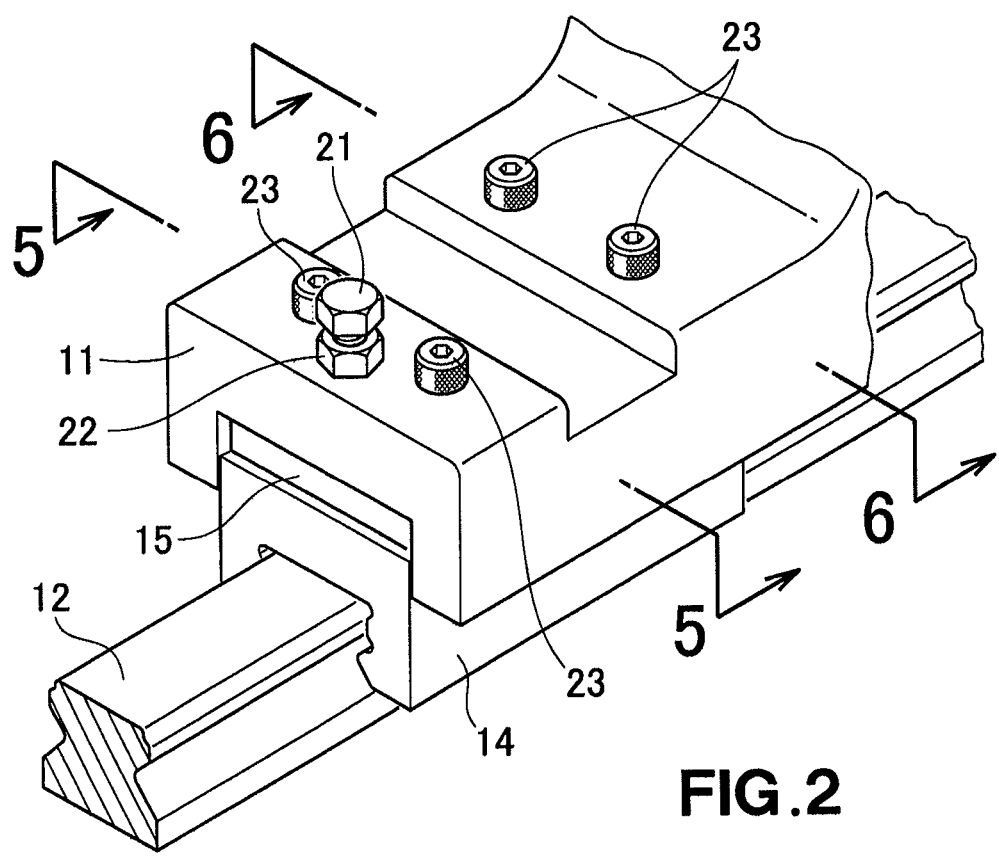
FIG. 2 is an enlarged view of a section encircled at 2 in FIG. 1.

As shown in FIG. 2, for each of the leg sections 11 of the movable platen 10, the movable platen support structure 100 includes a slider 14 fitted over one of the rails 12 and a flat plate 15 placed on the slider 14, and the leg section 11 is placed on the flat plate 15.

Figure 3:
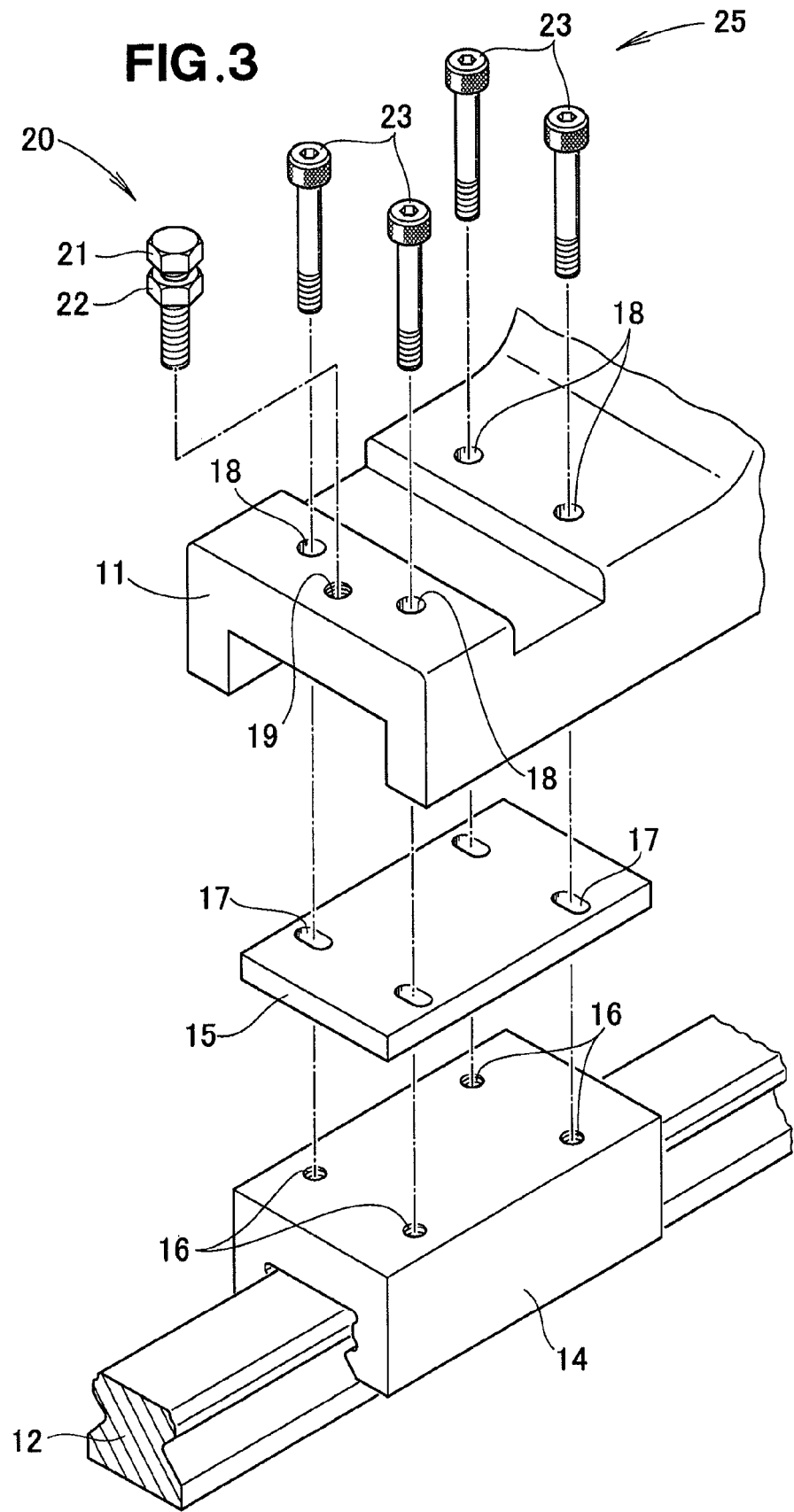
FIG. 3 is an exploded perspective view of a movable-platen height adjustment mechanism and a fastening mechanism in the movable platen support structure.

Further, as shown in FIG. 3, the slider 14 has four female threaded portions 16 formed in its upper section near four corner portions of the rectangular shape.

The flat plate 15 has four holes 17 elongated in the width direction (i.e., perpendicular to a longitudinal direction of the rail 12). The leg section 11 has four bolt holes 18, and a female threaded portion 19 formed between two of the bolt holes 18.

An adjusting bolt 21 for adjusting a height of the movable platen 10 is oriented vertically and screwed into the female threaded portion 19 from above. A lock nut 22 is screwed over the adjusting bolt 21 in advance. Further, as a fastening mechanism 25, four fastening bolts 23 are screwed through corresponding ones of the four bolt holes 18, and the fastening bolts 23, having passed through the bolt holes 18 and the elongated holes 17, are screwed into corresponding ones of the four female threaded portions 16. Each of the fastening bolts 23 is preferably in the form of a hex socket head cap bolt.

Namely, the instant embodiment of the movable platen support structure 100 includes, in association with each of the leg sections 11 of the movable platen 10, a movable-platen height adjustment mechanism 20 that comprises the flat plate 15, and the adjusting bolt 21 screwed into the female threaded portion 19 formed in the leg section 11. Further, the instant embodiment of the movable platen support structure 100 also includes, in association with each of the leg sections 11 of the movable platen 10, the fastening mechanism 25 that comprises the fastening bolts 23 passed through the bolt holes 18 and the elongated holes 17 to be screwed into the female threaded portions 16.

Now, a description will be given about how the movable platen 10 is adjusted in height and fastened (fixed) following the height adjustment in the movable platen support structure 100.

First, operation of the movable-height height adjustment mechanisms 20 will be described with reference to FIG. 4A. The fastening bolts 23 are shown in FIG. 4A as removed from the leg sections 11 for simplicity and convenience; however, the fastening bolts 23 may be provisionally screwed in the leg sections 11 at the time of the height adjustment.

Figure 4A:
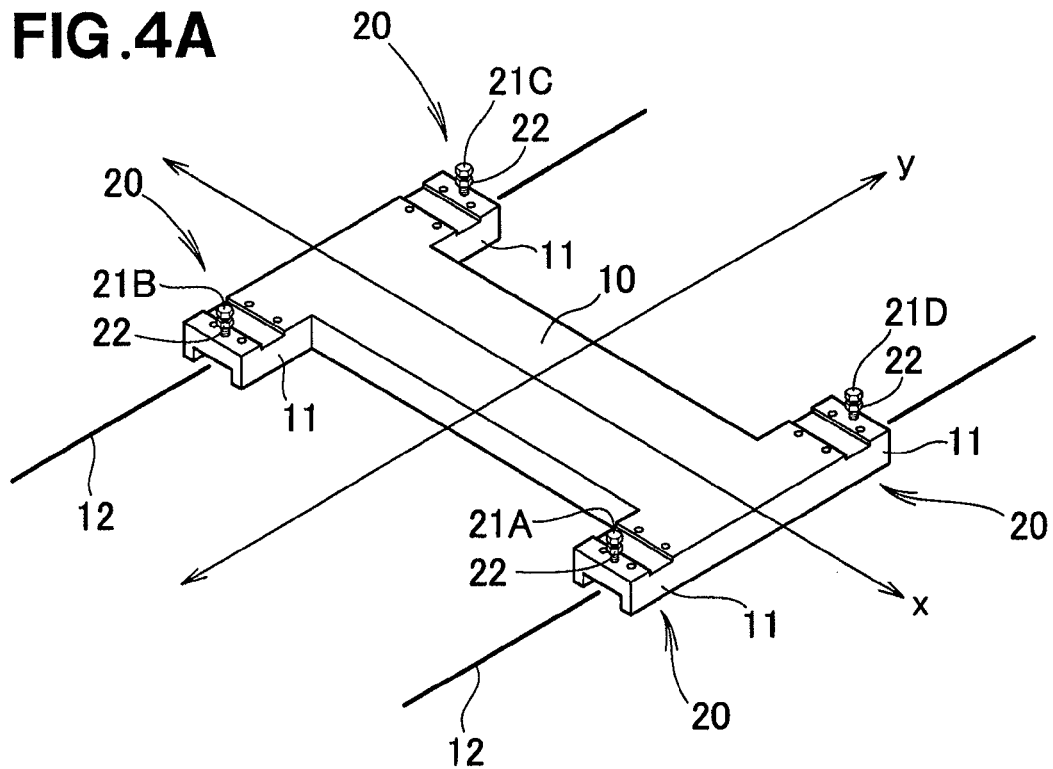
FIGS. 4A and 4B are schematic views explanatory of operation of the movable-platen height adjustment mechanism.

In FIG. 4A, an axis x extends in a direction intersecting the rails 12, and another axis y extends parallel to the rails 12. Further, for convenience of description, the four adjusting bolts 21 will be referred to separately as "first bolt 21A", "second bolt 21B", "third bolt 21C" and "fourth bolt 21D".

As the first and fourth bolts 21A and 21D are screwed into the corresponding female threaded portions 19, the movable platen 10 turns (tilts) about the y axis so that a portion of the platen 10 located adjacent to the left rail 12 moves upward. Similarly, as the second and third bolts 21B and 21C are screwed into the corresponding female threaded portions 19, the movable platen 10 turns (tilts) about the y axis so that a portion of the platen 10 located adjacent to the right rail 12 moves upward.

Further, as the first and third bolts 21A and 21B are screwed into the corresponding female threaded portions 19, the movable platen 10 turns (tilts) about the x axis so that a portion of the platen 10 located adjacent to a mold moves upward. Similarly, as the third and fourth bolts 21C and 21D are screwed into the corresponding female threaded portions 19, the movable platen 10 turns (tilts) about the x axis so that a portion of the platen 10 located opposite from the mold moves upward.

Whereas a typical example of the movable-platen height adjustment by the movable-height height adjustment mechanisms 20 has been described above, the levelness of the movable platen 10 can be attained or adjusted by differentiating, as necessary, the degree of fastening among the first to fourth bolts 21A to 21D.

Figure 4B:
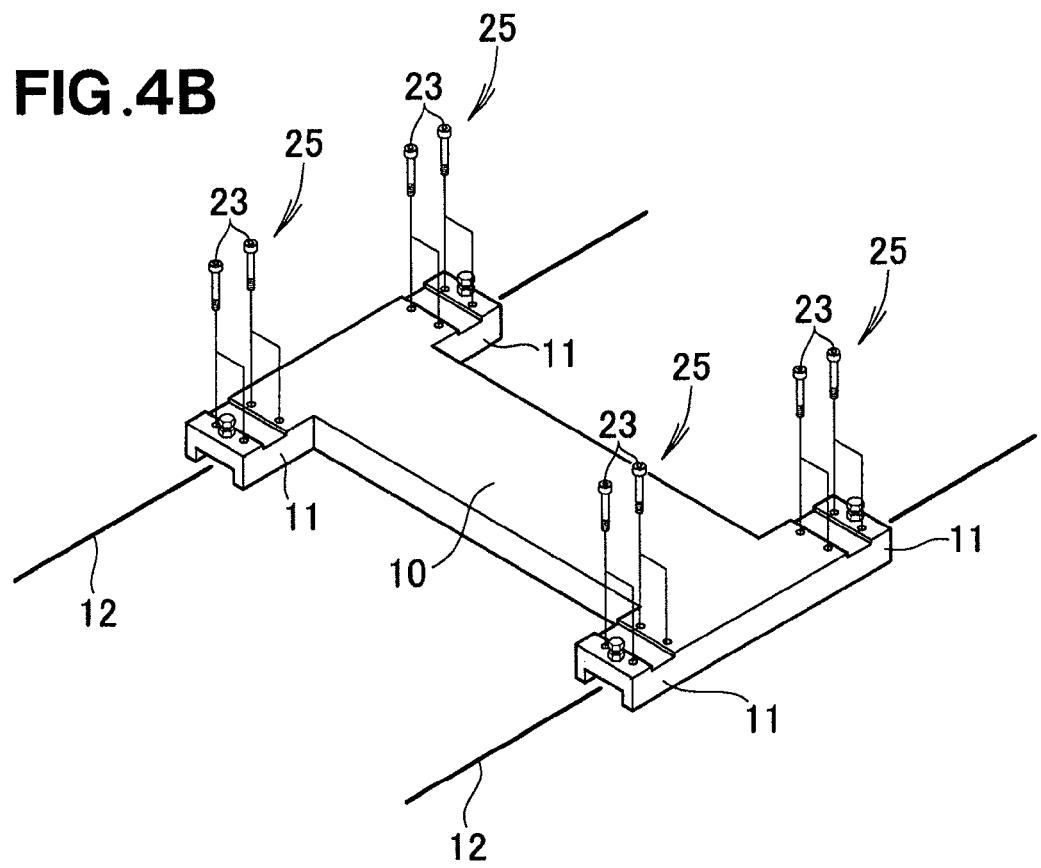

Upon completion of the height adjustment, the lock nuts 22 are tightened, so that subsequent unintended or accidental loosening of the first to fourth bolts 21A to 21D can be prevented. Then, the leg sections 11 are fastened (fixed) by the fastening bolts 23 with the first to fourth bolts 21A to 21D maintained in the tightened state, as shown in FIG. 4B.

Through the fastening, by the fastening bolts 23, of the leg sections 11, the distal end (lower end) of each of the adjusting bolts 21 is kept abutted against the flat plate 15. Unintended or accidental loosening of the adjusting bolt 21 can be prevented by the lock nut 22. Gaps C1 and C2 are left between the leg section 11 and the flat plate 15. If the inclination of the movable platen 10 is adjusted, the gaps C1 and C2 assume different values. Thus, the fastening bolts 16 are screwed into the corresponding female threaded portions 16 with due attention such that the gaps C1 and C2 do not vary. More specifically, the fastening bolts 23 are tightened with the same fastening torque.

In FIG. 6 too, the fastening bolts 23 are tightened with the same fastening torque. As clearly seen from FIGS. 5 and 6, the adjusting bolt 21 and the fastening bolts 23 do not project forward and rearward and leftward and rightward from the leg section 11 although they project upward from the leg section 11. Namely, the adjusting bolt 21 is accommodated within the width of the leg section 11 with no portion of the adjusting bolt 21 projecting laterally outward from the leg section 11. Thus, the movable platen support structure 100 can be constructed compact as seen in FIG. 1.

Note that the movable platen 10 shown in FIG. 1 rises in temperature by being exposed to heat from the mold. The leg sections 11 too rise in temperature in a similar manner.

Figure 5:
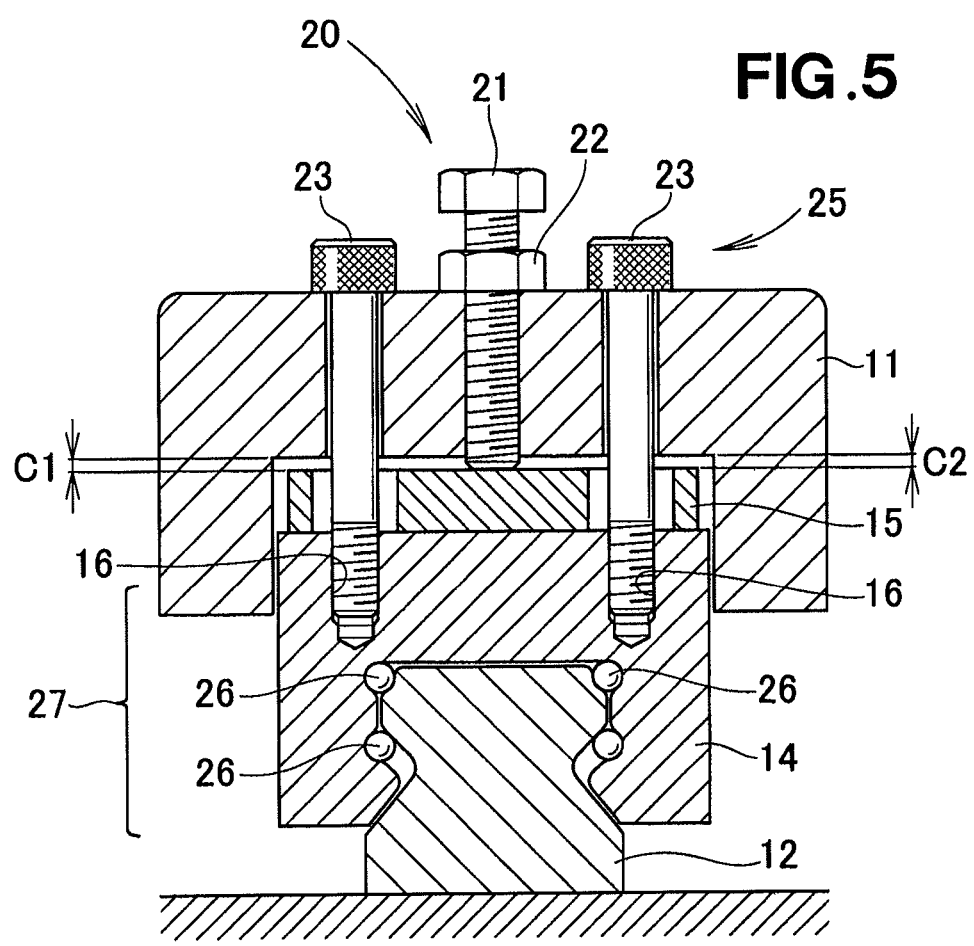
FIG. 5 is a sectional view taken along line 5-5 of FIG. 2.

Further, as shown in FIG. 5, a linear guide mechanism 27, via which the movable platen 10 is movable horizontally, comprises the rails 12, the sliders 14, and bearings 26 interposed between the rails 12 and the sliders 14. The bearings 26 have to be rolled in order to move the sliders 14 relative to the corresponding rails 12. A small clearance is provided around each of the bearings 26. If the clearance decreases in size due to thermal expansion, rolling of the bearing 26 would be disturbed. If the clearance is increased in size in preparation for thermal expansion, the slider 14 in a cold condition would swing laterally and thus the horizontal sliding movement of the slider 14 would be disturbed. For at least this reason, temperature variation is not preferable for the linear guide mechanism 27 containing the bearings 26.

Further, because the clearances C1 and C2 are in the form of layers of air, they can function as good head-insulating layers. Heat of each of the leg sections 11 transmits via the adjusting bolt 21 to the flat plate 15, from which the heat is transmitted to the slider 12. Because an area the adjusting bolt 21 contacts the slider 14 is extremely small as compared to a plane area of the flat plate 15, an amount of the heat transmission from the adjusting bolt 21 can be suppressed. Thus, the inventive construction requiring the gaps C1 and C2 can avoid the bearings 26 from rising in temperature; the temperature rise of the bearings 26, if any, is very slight.

However, if the gaps C1 and C2 are extremely small, the heat-insulating performance by the air layers would degrade. To avoid such heat-insulating performance degradation, the following measures are recommendable.

Namely, the flat plate 15 is formed of a material having a lower heat conductivity than the leg section 11 and the slider 14. For example, the flat plate 15 is formed of SUS304 stainless steel having a heat conductivity of 16.3 W/(m/K), the leg section 11 is formed of cast iron having a heat conductivity of 52.0 W/(m/K), and the slider 14 is formed of low-carbon steel having a heat conductivity of 54.0 W/(m/K). Because the heat conductivity of the flat plate 15 is one-third the heat conductivity of the leg section 11, it can perform a function of shutting off flows of heat. In addition, the adjusting bolt 21 may be formed of SUS304 stainless steel.

Whereas the embodiment of the movable platen support structure 100 has been described above in relation to the case where two sliders 14 are placed on each of the rails 12, three or more sliders 14 may be placed on each of the rails 12. Further, whereas the embodiment has been described above in relation to the case where the movable platen 10 is supported on the two rails 12, it may be placed on four rails 12.

Furthermore, because a local load of each of the adjusting bolts 21 acts on the flat plate 15 as seen in FIG. 5, a depression may be undesirably formed in the upper surface of the flat plate 15. In such a case, the flat plate 15 is replaced with another one. If the distal end (lower end) of the adjusting bolt 21 is abutted directly against the slider 14, not via the flat plate 15, then a depression may be undesirably formed in the upper surface of the slider 14. Because the slider 14 has to be replaced together with the rail 12, necessary replacing cost increases. On the other hand, the present invention, requiring replacement of the flat plate 15 alone, can reduce the replacing cost.

The basic principles of the present invention is well suited for application to movable platens of injection molding apparatus.

What is claimed is:

1. A movable platen support structure for an injection molding apparatus, comprising:
   a linear guide mechanism via which a movable platen of the injection molding apparatus is mounted on a bed for horizontal movement, the linear guide mechanism including a plurality of rails provided in parallel spaced apart relation to each other in a width direction of the bed, and a plurality of sliders mounted on each of the rails via bearings in spaced apart relation to each other in a longitudinal direction of the rail, the movable platen having a plurality of leg sections placed on corresponding ones of the sliders;
   a plurality of movable-platen height adjustment mechanisms provided in corresponding relation to the leg sections, each of the movable-platen height adjustment mechanisms comprising a flat plate placed on a corresponding one of the sliders, and an adjusting bolt screwed into a corresponding one of the leg sections and abutting at a distal end thereof against the flat plate; and
   a plurality of fastening mechanisms provided in corresponding relation to the leg sections and the movable-platen height adjustment mechanisms, each of the fastening mechanisms comprising a fastening bolt for, following movable platen height adjustment by the adjusting bolts, fastening a corresponding one of the leg sections to a corresponding one of the sliders by being passed through the corresponding leg section and a corresponding one of the flat plates so as to be screwed into the corresponding slider.

2. The movable platen support structure according to claim 1, wherein the flat plate is formed of a material having lower heat conductivity than the leg section and the slider.

* * * * *